United States Patent Office.

RUDOLF KECK, OF CLINTONVILLE, NEW YORK.

Letters Patent No. 69,348, dated October 1, 1867.

IMPROVED MODE OF TREATING SLAGS AND CINDERS FOR THE MANUFACTURE OF IRON.

*The Schedule referred to in these Letters Patent and making part of the same.*

TO ALL WHOM IT MAY CONCERN:

Be it known that I, RUDOLF KECK, of Clintonville, in the county of Clinton, and in the State of New York, have invented a new and useful improvement in Treating Slags and Cinders of Iron-Furnaces; and I do hereby declare that the following is a full, clear, and exact description thereof, which will enable those skilled in the art to make and use the same.

This invention consists in subjecting slags and cinders received from iron-furnaces, after the same have been pulverized, to the action of a separating apparatus in such a manner that all the light parts, that is to say the silicates, are carried off, and pure iron, mixed with a small quantity of oxide of iron and of silicates, remains; and the iron thus obtained can be readily melted, and reduced directly to wrought iron.

The ordinary way of treating slags and cinders of iron-furnaces is to pulverize the same, mix them with lime, and then melt this mixed mass and reduce it to pig iron. On account of the large quantity of silicate o' iron contained in the slags it has been impossible by this process to produce anything but pig iron; and nobody, to my knowledge, has ever succeeded in producing from slags and cinders a sufficient quantity of wrought iron to render the process economical. After long experiments I have succeeded in effecting this purpose simply by subjecting the pulverized slags and cinders to the action of a separating apparatus of any desired construction, though I prefer an apparatus on the wet principle. This treatment I have adopted after having found that slags and cinders were not, as was heretofore erroneously supposed, composed entirely of silicates of iron; but they contain a large percentage of pure iron and of oxide of iron. By the action of the separator the light silicates, and some of the oxide, are carried off, and the pure iron and oxide of iron mixed with a small quantity of silicates remain. This residue I reduce in a puddling-furnace, or in a bloomery fire, and I obtain from it good wrought iron by a direct and cheap process. This iron is especially adapted for steel. By these means a saving of at least twenty to thirty-three per cent in treating slags can be effected, the process of reducing them to wrought iron being materially cheapened and simplified, as has been fully proved by the results obtained in treating slags and cinders according to my process on a large scale in the works of the Peru Steel and Iron Company, at Clintonville, New York.

What I claim as new, and desire to secure by Letters Patent, is—

The within-described process of reducing slags and cinders directly into wrought iron by subjecting them, after they have been pulverized, to the action of a separating apparatus, and reducing the residuum in a puddling-furnace or bloomery fire, as set forth.

RUDOLF KECK.

Witnesses:
  W. HAUFF,
  G. BERG.